(12) United States Patent
Tang

(10) Patent No.: US 11,048,146 B1
(45) Date of Patent: Jun. 29, 2021

(54) CAMERA CIRCUITRY AND CAMERA DEVICE

(71) Applicant: Shenzhen Reolink Technology Co., Ltd., Shenzhen (CN)

(72) Inventor: Lei Tang, Shenzhen (CN)

(73) Assignee: Shenzhen Reolink Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/202,369

(22) Filed: Mar. 16, 2021

(30) Foreign Application Priority Data

Aug. 21, 2020 (CN) .......................... 202010847878.4

(51) Int. Cl.
*G03B 7/091* (2021.01)
*H04N 5/232* (2006.01)

(52) U.S. Cl.
CPC ............. *G03B 7/091* (2013.01); *H04N 5/232* (2013.01)

(58) Field of Classification Search
CPC ..................................................... G03B 7/091
See application file for complete search history.

(56) References Cited

U.S. PATENT DOCUMENTS

| 5,276,508 A | * | 1/1994 | Boisvert | ................ | H04N 9/735 |
| | | | | | 327/91 |
| 6,404,488 B1 | * | 6/2002 | Martin | ....................... | G01J 1/44 |
| | | | | | 356/218 |
| 2002/0110376 A1 | * | 8/2002 | MacLean | ........... | H04N 5/35563 |
| | | | | | 396/429 |

* cited by examiner

*Primary Examiner* — Clayton E. LaBalle
*Assistant Examiner* — Dennis Hancock
(74) *Attorney, Agent, or Firm* — Idea Intellectual Limited; Margaret A. Burke; Sam T. Yip

(57) ABSTRACT

This application discloses a camera circuitry and a camera device. The camera circuitry includes a light collection circuit, an operational amplification circuit, an image processor and a first resistor. The light collection circuit is used to collect the brightness value and pass the collected brightness value through the operational amplification circuit and the first resistor are then transmitted to the image processor, and the image processor initiate imaging based on the brightness value. By providing an operational amplification circuit and a first resistor at the back end of the light collecting circuit, and adopting a continuous power supply mode for the light collecting circuit and the operational amplification circuit, the convergence speed of the light brightness value is effectively improved, so that accurate ambient light brightness values can be obtained faster to achieve normal camera functions.

18 Claims, 2 Drawing Sheets

CAMERA CIRCUITRY AND CAMERA DEVICE

CROSS-REFERENCES TO RELATED APPLICATIONS

This application claims priority to the Chinese patent application No. 202010847878.4 filed on Aug. 21, 2020, and the disclosure of which is incorporated herein by reference in its entirety.

FIELD OF THE INVENTION

This invention relates to the field of electronics technology, in particular to camera circuitry and camera device.

BACKGROUND OF THE INVENTION

In general, camera devices powered by battery may be set at standby mode and triggered by infra-red light from human body to start video recording. Therefore, it is desirable to take as short as possible time for the camera from being triggered to starting video recording. During this process, light sensors detect ambient luminance and transmit the detected signal to image processor. There is a convergence time for the light sensor from starting to outputting stable and accurate luminance values. When such convergence time is longer than initiation time of the image processor, brightness value output by the light sensor before it outputs a stable brightness value will be used by the image processor. As a result, the brightness of the first few frames of image obtained by the camera may be abnormal or the camera display is switched between color mode and black-and-white mode abnormally. Especially at night (low-illumination environment), the convergence time for the output voltage of the light sensor to reach a stable value as long as 300 ms, which is much longer than the time taken by the image processor from being waken up to starting video recording.

It can be seen that the slow convergence speed of the luminance value in the camera device will result in a longer time for the camera circuit from wake up to output the normal picture, that is, abnormal brightness of the first few frames of image obtained by the camera or unexpected switching between color mode and black-and-white mode will be caused, which may degrade the quality of video recorded by the camera.

SUMMARY OF THE INVENTION

The present application provides a camera circuitry and a camera device, which can solve the technical problem of poor imaging quality due to slow brightness value convergence speed in existing camera devices.

According to a first aspect of the present invention, a camera circuitry is provided. The camera circuitry comprises: a light collection circuit, an operational amplification circuit, an image processor and a first resistor; the light collection circuit has a terminal electrically connected to an input terminal of the operational amplification circuit; the operational amplification circuit has an output terminal electrically connected to an input terminal of the image processor through the first resistor; wherein: the light collection circuit and the operational amplification circuit are powered in a continuous power supply mode; the light collection circuit collects the brightness value and transmits the collected brightness value to the image processor via the operational amplification circuit and the first resistor; and the image processor initiates image recording based on the brightness value.

Optionally, the first resistor is a variable resistor and has a resistance value ranged from range from 3.3 kΩ to 1.8 MΩ.

Optionally, the camera circuitry further comprises a first capacitor having a first terminal electrically connected to the terminal of the light collection circuit, and a second terminal connected to a ground, wherein the first capacitor has a capacitance value smaller than or equal to 1 μF.

Optionally, the operational amplification circuit comprises an operational amplifier and a second capacitor; the second capacitor have a first terminal electrically connected to a power supply terminal of the operational amplifier and a second terminal connected to a ground; the operational amplifier has an inverting input terminal, a non-inverting input terminal, an output terminal; wherein: the inverting input terminal of the operational amplifier is connected to the light collection unit as an input terminal of the operational amplifier; the output terminal of the operational amplifier is connected to the non-inverting input terminal of the operational amplifier and electrically connected to the input terminal of the image processor through the first resistor as an output terminal of the operational amplification circuit; and the operational amplifier is used to amplify the brightness value collected by the light collection circuit.

Optionally, the second capacitor has a capacitance value smaller than or equal to 1 μF.

Optionally, the camera circuitry further comprises a third capacitor C3 having a terminal electrically connected to the input terminal of the image processor, wherein the third capacitor has a capacitance value smaller than or equal to 0.1 μF.

Optionally, the light collection circuit comprises a visible light sensor and a second resistor R2; wherein: the visible light sensor and the second resistor R2 are connected in series with each other; and the visible light sensor is used for collecting brightness value of ambient illuminance.

Optionally, the second resistor has a resistance value of at least 1.8 MΩ.

Optionally, the second resistor acts as a pull-up resistor or a pull-down resistor to the visible light sensor.

According to another aspect of the present invention, a camera device is provided. The camera device includes the above-said camera circuitry.

By providing an operational amplification circuit and a first resistor at the back end of the light collecting circuit, and adopting a continuous power supply mode for the light collecting circuit and the operational amplification circuit, the camera circuitry and camera device provided by the subject application can effectively improve the light brightness value convergence speed so that accurate ambient light brightness values can be obtained to achieve normal camera functions more quickly.

BRIEF DESCRIPTION OF THE DRAWINGS

In order to more clearly illustrate technical solutions in the embodiments of the present invention or in the prior arts, following are some brief descriptions with respect to drawings required in the description of the embodiments or in the prior art. Obviously, the drawings described below are just some embodiments of the present invention. For an ordinary person skilled in the art, other drawings may be conceived according to these drawings without creative effort.

DETAILED DESCRIPTION

Figure 1:
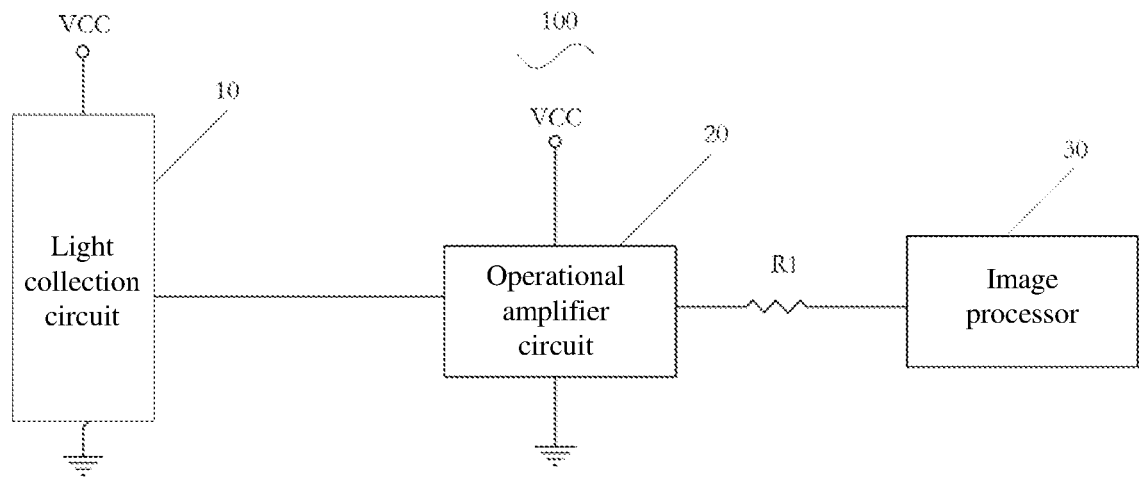
FIG. 1 is a circuit structure diagram of a first camera circuitry provided by the present application.

In order to make purposes, characteristics and advantageous of the present application more obvious and understandable, the technical solutions in the embodiments of the present application will be described clearly and completely in conjunction with the drawings of the embodiments of the present invention. Apparently, the described embodiments are only some but not all of embodiments of the present invention. All other embodiments obtained without creative work by an ordinary person skilled in the art based on these embodiments of the present invention shall be covered by the scope of the present invention.

The embodiments of the present application are described in detail below. Examples of the embodiments are shown in the accompanying drawings, wherein the same or similar elements or elements with the same or similar functions are indicated with the same or similar reference numerals. The following embodiments described with reference to the drawings are only for exemplary and illustrative purpose and should not be understood as a limitation to the application.

In the description of the present application, it should be understood that orientation or positional relationship indicated with the terms "center", "longitudinal", "transverse", "length", "width", "thickness", "upper", "lower", "front", "rear", "left", "right", "vertical", "horizontal", "top", "bottom", "inner", "outer", "clockwise", "counterclockwise" are based on the orientation or position relationship shown in the drawings, which are only for the convenience and simplicity in describing, rather than indicating or implying that the device or element referred to must have a specific orientation, be constructed and operated in a specific orientation, and therefore should not be understood as a limitation of this application. In addition, the terms "first" and "second" are only used for descriptive purposes, and cannot be understood as indicating or implying relative importance or implicitly indicating the number of indicated technical features. Thus, the features defined with "first" and "second" may explicitly or implicitly include one or more features. In the description of this application, "multiple" means two or more than two, unless otherwise specifically defined.

In the description of this application, it should be noted that, unless otherwise clearly specified and limited, the terms "installation", "connection" and "conjunction" should be understood in a broad sense, for example, it can be a fixed connection, a detachable connection or integral connection; it can be mechanically connected, or electrically connected, or communicable with each other; it can be directly connected, or indirectly connected through an intermediate medium; it can be the internal communication of two components or the interaction of two components relationship. For those of ordinary skill in the art, the specific meanings of the above-mentioned terms in this application can be understood according to specific circumstances.

In this application, unless expressly stipulated and defined otherwise, the first feature being "above" or "below" the second feature may encompass that the first and second features is in direct contact, or the first and second features is not in contact directly but through other features between them. Moreover, the first feature being "above" the second feature may encompass that the first feature is directly above and obliquely above the second feature, or merely indicating that the first feature is higher in level than the second feature. The first feature being "below" the second feature may encompass that the first feature is directly below and obliquely below the second feature, or it simply means that the level of the first feature is lower than the second feature.

The following disclosure provides many different embodiments or examples for realizing different structures of the present application. In order to simplify the disclosure of the present application, the components and settings of specific examples are described below. Of course, they are for exemplary purpose and are not intended to be limiting. In addition, reference numerals and/or reference letters may be repeated in different examples. Such repetition is for simplicity and clarity, and does not indicate the relationship between the various embodiments and/or settings discussed. In addition, this application provides examples of various specific processes and materials, but those of ordinary skill in the art may be aware of the application of other processes and/or the use of other materials.

A camera circuitry 100 is provided according to some embodiments of the present application. The camera circuitry 100 may comprise: a light collection circuit 10, an operational amplification circuit 20, an image processor 30, and a first resistor R1. As shown in FIG. 1, one terminal of the light collection circuit 10 is electrically connected with an input terminal of the operational amplification circuit; an output terminal of the operational amplification circuit 20 is electrically connected with an input terminal of the image processor 30 through the first resistor R1; each of the light collection circuit 10 and the operational amplification circuit 20 also includes a power terminal and a ground terminal.

In the embodiments of the present application, by providing an operational amplification circuit and a first resistor at the back end of the light collecting circuit, and adopting a continuous power supply mode for the light collecting circuit and the operational amplification circuit, the convergence speed of the brightness value is effectively improved such that the image processor can obtain an accurate ambient light brightness value and realize the normal camera function faster. Abnormal image display and unexpected switching between color and black-and-white modes due to the use of the wrong ambient brightness value can therefore be avoided.

It should be noted here that, under normal circumstances, the camera circuitry provided according to the embodiments of the present invention may further comprise an image sensor (not shown) which will output a black-and-white image at night mode, and output a color image at day mode. When the image sensor is woken up and operated on basis of the wrong ambient brightness value, the output image probably has abnormal brightness, or incorrectly judged to be generated at color or black-and-white modes. For example, the image is generated at black-and-white mode during day time or generated at color mode at night time; or the brightness value convergence is switched back and forth in this process.

In the camera circuitry provided according to the embodiments of the present invention, in addition to applying a continuous power supply to the light collecting circuit to speed up the convergence speed of the light collecting circuit, an operational amplification circuit and a first resistor are added at the back end of the light collecting circuit. The operational amplification circuit is used to improve driving power of the circuitry. The first resistor R1 is connected in series at the back end of the operational amplification circuit for current limiting, and its resistance value can be used to further adjust the convergence speed of the brightness value.

In some embodiments, the resistance of the first resistor R1 may be a fixed resistor with a constant resistance. In other embodiments, the first resistor R1 may be a variable resistor. The resistance value of the fixed resistor and the variable resistor may range from 3.3 kiloohms (kΩ) to 1.8 megaohms (MΩ).

Theoretically, the smaller the resistance of the first resistor R1, the faster the brightness value convergence speed of the camera circuitry provided by the embodiment of the present invention, but the greater leakage current loss may be caused. Therefore, the resistance of the first resistor may be selected according to the actual situation and requirements of the camera circuit.

In the embodiment of the present application, it can be realized that the brightness value convergence speed can be faster than or close to the startup speed of the image processor so that the first ambient light brightness value used by the image processor is already stable and accurate, thereby able to achieve better imaging effects. Brightness value reaches stability when it is convergent. The faster the convergence speed, the faster the brightness reaches a stable value. Generally speaking, the reached stable value is the true brightness value under the current environment.

Hereinafter, based on the camera circuitry provided in the above-mentioned embodiments, camera circuitries according to other embodiments of this application are further described.

In some embodiments, the light collection circuit 10 may include a visible light sensor and a second resistor. The visible light sensor is a light sensitive electronic component. As the light intensity changes, its impedance will also change. Therefore, by connecting the visible light sensor with the second resistor in series to form a voltage divider, the brightness value sensed by the visible light sensor can be calculated from the reading value of the voltage across the second resistor.

Figure 2:
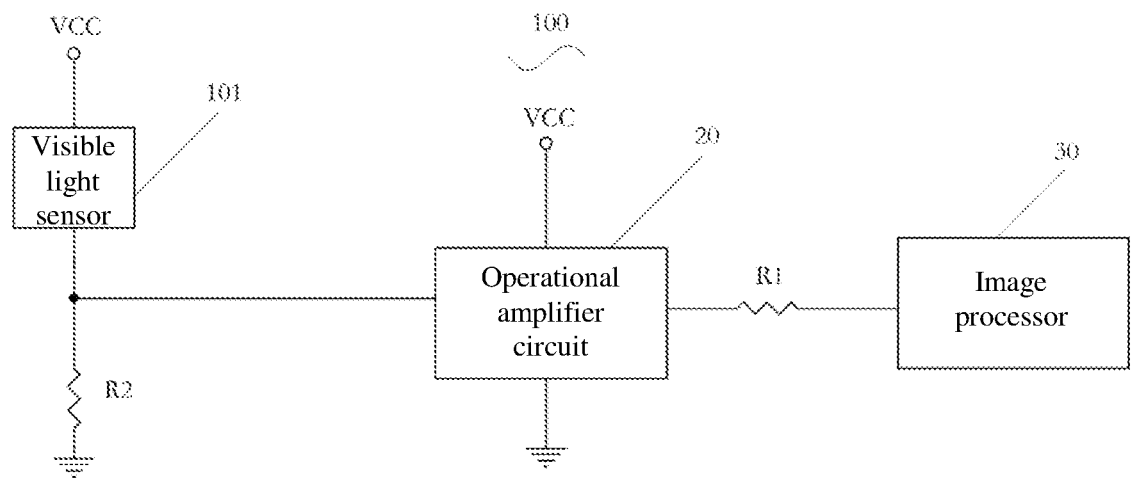
FIG. 2 is a circuit structure diagram of a second camera circuitry provided by the present application.
Figure 3:
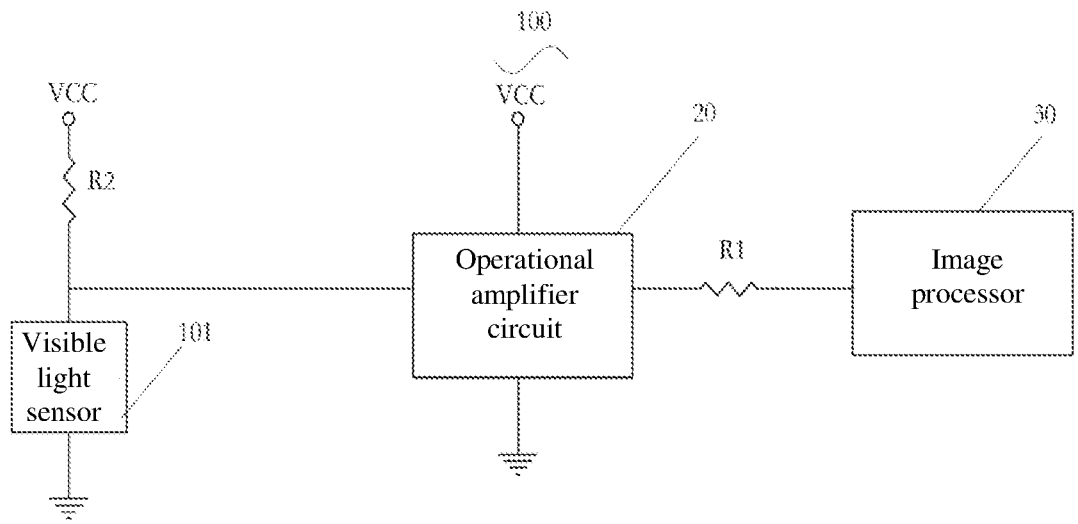
FIG. 3 is a circuit structure diagram of a third camera circuitry provided by the present application.

Referring to FIGS. 2 and 3. FIGS. 2 and 3 show the connection relationship of the devices in some embodiments. Compared with FIG. 1, the light collection circuit 10 also includes a visible light sensor 101 and a second resistor R2. Second resistor R2 can be a pull-up resistor (as shown in FIG. 3) or a pull-down resistor (as shown in FIG. 2). It should be noted here that although the light collection circuit 10 (or the light sensor 101) is powered with a continuous power supply, that is, being supplied with power even when the system is operated at a sleep mode, the increase in power consumption of the light collection circuit can be well-controlled by connecting the light sensor in series with a second resistor of large resistance.

Figure 4:
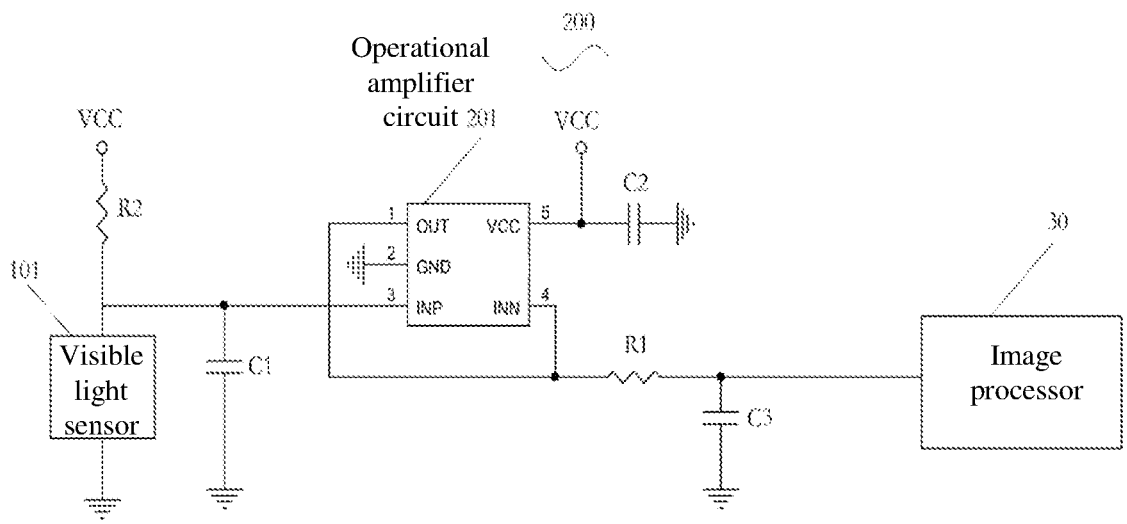
FIG. 4 is a circuit structure diagram of a fourth camera circuitry provided by the present application.

Referring to FIG. 4. The embodiment of the present application may also provide a camera circuit 200 including a visible light sensor 101, a second resistor R2, an operational amplifier 201, an image processor 30, a first resistor R1, and a first capacitor C1, a second capacitor C2, and a third capacitor C3.

In the camera circuit of FIG. 4, the fifth terminal (VCC) of the operational amplifier 201 represents the power supply terminal of the operational amplifier 201, and the second terminal (GND) of the operational amplifier 201 represents the ground terminal of the operational amplifier 201; the fourth terminal (INN) of the operational amplifier 201 represents the non-inverting input terminal of the operational amplifier 201, the third terminal (INP) of the operational amplifier 201 represents the inverting input terminal of the operational amplifier 201; and the first terminal (OUT) of the amplifier 201 represents the output end of the operational amplifier 201.

The first terminal (OUT) of the operational amplifier 201 is connected to the fourth terminal (INN) and connected to one terminal of the first resistor R1; and the other terminal of the first resistor R1 is electrically connected to the input terminal of the image processor 30. In this embodiment, the one terminal of the first resistor R1 being connected to the image processor 30 is also connected to the third capacitor C3, and the other terminal of the third capacitor C3 is grounded.

The second terminal (GND) of the operational amplifier 201 is grounded.

The third terminal (INP) of the operational amplifier 201 is used as the input terminal of the operational amplification circuit being electrically connected between the visible light sensor and one terminal of the second resistor R2. The other terminal of the second resistor is connected to the power supply. The third terminal (INP) of the operational amplifier 201 is also connected to one terminal of the first capacitor C1, and the other end of the first capacitor C1 is grounded.

The fifth terminal (VCC) of the operational amplifier 201 is connected to the power supply. Concurrently, in this embodiment, the fifth terminal of the operational amplifier 201 is also connected to one terminal of the second capacitor C2, and the other terminal of the second capacitor C2 is grounded. The visible light sensor 101 is used to collect the brightness value of ambient illuminance, and the operational amplifier 201 is used to amplify the brightness value collected by the visible light sensor.

It should be noted that in the embodiments of the present application, both the visible light sensor and the operational amplifier are powered at a continuous mode by a power supply.

In this embodiment, the first resistor R1 is a variable resistor with resistance value ranges from 3.3 kiloohms (kΩ) to 1.8 megaohms (MΩ). The resistance of the second resistor is at least 1.8 megaohms (MΩ). The capacitance value of the first capacitor is less than or equal to 1 microfarad (μF), which provides function of filtering. The capacitance value of the second capacitor is less than or equal to 1 microfarad (μF), which provides function of voltage stabilization. The capacitance value of the third capacitor is less than or equal to 0.1 microfarad (μF), which provides function of voltage stabilization.

Furthermore, various imaging devices may also be provided in accordance with various embodiments of the present application, each includes any one of the imaging circuitries provided in the above embodiments.

In the description of this specification, reference is made to the terms "various embodiments", "one embodiment", "some embodiments", "exemplary embodiments", "examples", "specific examples", or "some examples". The description means that a specific feature, structure, material, or characteristic described in conjunction with the embodiment or example is included in at least one embodiment or example of the present application. In this specification, the illustrative representation of the above-mentioned terms does not necessarily refer to the same embodiment or example. Moreover, the described specific features, structures, materials or characteristics can be combined in any one or more embodiments or examples in a suitable manner.

Although the embodiments of the present application have been shown and described above, it can be understood that the above-mentioned embodiments are exemplary and should not be construed as limiting the present application. It should be understood that a person of ordinary skill in the art can make changes, modifications, substitutions and modifications to the above-mentioned embodiments within the scope of this application. The scope of this application is defined by the claims and their equivalents.

What is claimed is:

1. A camera circuitry, comprising: a light collection circuit, an operational amplification circuit, an image processor and a first resistor; the light collection circuit has a terminal electrically connected to an input terminal of the operational amplification circuit; the operational amplification circuit has an output terminal electrically connected to an input terminal of the image processor through the first resistor; wherein:
   the light collection circuit and the operational amplification circuit are powered in a continuous power supply mode;
   the light collection circuit collects the brightness value and transmits the collected brightness value to the image processor via the operational amplification circuit and the first resistor; and
   the image processor initiates image recording based on the brightness value.

2. The camera circuitry according to claim 1, wherein the first resistor is a variable resistor and has a resistance value ranged from range from 3.3 kΩ to 1.8 MΩ.

3. The camera circuitry according to claim 1, further comprising a first capacitor having a first terminal electrically connected to the terminal of the light collection circuit, and a second terminal connected to a ground, wherein the first capacitor has a capacitance value smaller than or equal to 1 μF.

4. The camera circuitry according to claim 1, wherein the operational amplification circuit comprises an operational amplifier and a second capacitor;
   the second capacitor have a first terminal electrically connected to a power supply terminal of the operational amplifier and a second terminal connected to a ground;
   the operational amplifier has an inverting input terminal, a non-inverting input terminal, an output terminal; wherein:
      the inverting input terminal of the operational amplifier is connected to the light collection unit as an input terminal of the operational amplifier;
      the output terminal of the operational amplifier is connected to the non-inverting input terminal of the operational amplifier and electrically connected to the input terminal of the image processor through the first resistor as an output terminal of the operational amplification circuit; and
   the operational amplifier is used to amplify the brightness value collected by the light collection circuit.

5. The camera circuitry according to claim 4, wherein the second capacitor has a capacitance value smaller than or equal to 1 μF.

6. The camera circuitry according to claim 1, further comprising a third capacitor C3 having a terminal electrically connected to the input terminal of the image processor, wherein the third capacitor has a capacitance value smaller than or equal to 0.1 μF.

7. The camera circuitry according to claim 1, wherein the light collection circuit comprises a visible light sensor and a second resistor R2; wherein:
   the visible light sensor and the second resistor R2 are connected in series with each other; and
   the visible light sensor is used for collecting brightness value of ambient illuminance.

8. The camera circuitry according to claim 7, wherein the second resistor has a resistance value of at least 1.8 MΩ.

9. The camera circuitry according to claim 7, wherein the second resistor acts as a pull-up resistor or a pull-down resistor to the visible light sensor.

10. A camera device including a camera circuitry, wherein:
   the camera circuitry comprising: a light collection circuit, an operational amplification circuit, an image processor and a first resistor; the light collection circuit has a terminal electrically connected to an input terminal of the operational amplification circuit; the operational amplification circuit has an output terminal electrically connected to an input terminal of the image processor through the first resistor;
   the light collection circuit and the operational amplification circuit are powered in a continuous power supply mode;
   the light collection circuit collects the brightness value and transmits the collected brightness value to the image processor via the operational amplification circuit and the first resistor; and
the image processor initiates image recording based on the brightness value.

11. The camera device according to claim 10, wherein the first resistor is a variable resistor and has a resistance value ranged from range from 3.3 kΩ to 1.8 MΩ.

12. The camera device according to claim 10, further comprising a first capacitor having a first terminal electrically connected to the terminal of the light collection circuit, and a second terminal connected to a ground, wherein the first capacitor has a capacitance value smaller than or equal to 1 μF.

13. The camera device according to claim 10, wherein the operational amplification circuit comprises an operational amplifier and a second capacitor;
   the second capacitor have a first terminal electrically connected to a power supply terminal of the operational amplifier and a second terminal connected to a ground;
   the operational amplifier has an inverting input terminal, a non-inverting input terminal, an output terminal; wherein:
      the inverting input terminal of the operational amplifier is connected to the light collection unit as an input terminal of the operational amplifier;
      the output terminal of the operational amplifier is connected to the non-inverting input terminal of the operational amplifier and electrically connected to the input terminal of the image processor through the first resistor as an output terminal of the operational amplification circuit; and
   the operational amplifier is used to amplify the brightness value collected by the light collection circuit.

14. The camera device according to claim 13, wherein the second capacitor has a capacitance value smaller than or equal to 1 μF.

15. The camera device according to claim 10, further comprising a third capacitor C3 having a terminal electrically connected to the input terminal of the image processor, wherein the third capacitor has a capacitance value smaller than or equal to 0.1 μF.

16. The camera device according to claim 10, wherein the light collection circuit comprises a visible light sensor and a second resistor R2; wherein:

the visible light sensor and the second resistor R2 are connected in series with each other; and the visible light sensor is used for collecting brightness value of ambient illuminance.

17. The camera device according to claim 16, wherein the second resistor has a resistance value of at least 1.8 MΩ.

18. The camera device according to claim 16, wherein the second resistor acts as a pull-up resistor or a pull-down resistor to the visible light sensor.

\* \* \* \* \*